US 6,617,415 B1

(12) United States Patent
Miksic et al.

(10) Patent No.: US 6,617,415 B1
(45) Date of Patent: Sep. 9, 2003

(54) BIODEGRADABLE CORROSION INHIBITOR PACKAGES

(75) Inventors: Boris A. Miksic, North Oaks, MN (US); Robert A. Boyle, Oakdale, MN (US)

(73) Assignee: Cortec Corporation, St. Paul, MN (US)

( * ) Notice: Subject to any disclaimer, the term of this patent is extended or adjusted under 35 U.S.C. 154(b) by 0 days.

(21) Appl. No.: 10/172,901

(22) Filed: Jun. 17, 2002

(51) Int. Cl.⁷ .............................................. C08G 63/00
(52) U.S. Cl. ........................ 528/190; 528/176; 528/193; 528/194; 528/271; 528/272
(58) Field of Search ................................ 528/176, 190, 528/193, 194, 271, 272

(56) References Cited

U.S. PATENT DOCUMENTS

| | | |
|---|---|---|
| 2,744,624 A | 5/1956 | Hoogstoel et al. |
| 3,018,015 A | 1/1962 | Agriss et al. |
| 3,142,599 A | 7/1964 | Chavannes |
| 3,231,454 A | 1/1966 | Williams |
| 3,769,145 A | 10/1973 | Gresham et al. |
| 4,017,351 A | 4/1977 | Larson et al. |
| 4,049,854 A | 9/1977 | Casey et al. |
| 4,344,536 A | 8/1982 | Oberhuber |
| 6,028,160 A * | 2/2000 | Chandler et al. ............ 528/176 |

FOREIGN PATENT DOCUMENTS

| | | | |
|---|---|---|---|
| DE | 2318582 | | 4/1973 |
| GB | 914489 | * | 7/1961 |
| GB | 1548865 | * | 6/1975 |

* cited by examiner

Primary Examiner—Terressa A. Boykin
(74) Attorney, Agent, or Firm—Haugen Law Firm PLLP

(57) ABSTRACT

Biodegradable resin products consisting essentially of a polymeric resin of starch, polyesters such as polylactic acid, or other suitable polyesters. In admixture with the resin is a particulate vapor phase corrosion inhibitor selected from amine salts, triazole derivatives, alkali dibasic acid salts, and mixtures thereof, and is present in an amount ranging from between about 1% and 3% by weight of the polymeric resin and which is shaped into formed articles.

2 Claims, No Drawings

BIODEGRADABLE CORROSION INHIBITOR PACKAGES

BACKGROUND OF THE INVENTION

The present invention is an improvement over that invention disclosed and claimed in U.S. Pat. No. 6,028,160 dated Feb. 22, 2000, and assigned to the same assignee as the present invention.

The present invention relates generally to an improved more environmental friendly resinous product package. The package incorporates the features of biodegradability together with the incorporation of a vapor phase corrosion inhibitor for protection of metallic surfaces positioned in proximity to the material. Plastic films and packing materials formed of raw materials which are biodegradable are commercially available, and because of their more environmental friendly properties, they are becoming more and more in demand. For example, plastic resin films in general have a wide variety of uses, including uses for packaging where they are utilized for forming enclosures such as shipping sacks to provide a protective environment for metallic articles placed within the sacks. Additionally, resinous products have been used to prepare other packaging articles or components, with such articles having found specific application as bulk packing dividers or fillers for cushioning objects in a wide variety of packaging applications. While conventional plastic resinous films and other objects fabricated from polyolefin resins have found wide application for packaging purposes, the need for resin products which are biodegradable is being recognized and for a variety of applications, is becoming a requirement. Because of their different physical properties, however, these products when prepared from biodegradable materials possess some disadvantageous characteristics or properties which may be overcome through utilization of the features of the present invention.

Biodegradable plastic films or objects have certain physical and mechanical properties which differ from those of the conventional and well-known polyolefin films such as polyethylene and polypropylene. For example, the commercially available biodegradable films are hygroscopic and also have significantly higher breathability and permeability. Because of these physical properties, biodegradable plastic films have typically offered less protection to metallic articles than is available from the more traditional polyolefin films. However, this disadvantage may be overcome when the biodegradable plastic resin film is combined with a particulate vapor phase corrosion inhibitor dispersed within and through the film or applied as a coating on the surface of the film. The selected vapor phase corrosion inhibitors used in connection with the present invention are highly compatible with biodegradable films, and offer significant long term protection to metallic articles in or near the package. In particular, those films comprising a film forming resin selected from the group consisting of a polylactic acid homopolymer, a polycaprolactone polymer or other suitable polyesters such as an adipic acid, succinic acid, butanediol and a small amount of terephthalic acid have been found to have beneficial effects when used in combination with inhibitors in accordance with the present invention. Films comprising these resins in either their pure or blended form possess the property of biodegradability along with higher permeability and higher breathability when compared to those same properties exhibited by conventional polyolefin films.

The selected vapor phase and contact corrosion inhibitors which have been found highly effective for use in connection with the present invention are amine salts, alkali nitrates, alkali dibasic acid salts, and triazole compounds. These materials have been found to have highly effective corrosion inhibiting properties when combined with or coated on films in accordance with the present invention. The corrosion inhibitors are preferably prepared and available in particulate form with particles being of a preferred size range. For most film applications, the corrosion inhibitors found most useful have a maximum particle size range less than about 50 microns, with a size of between about 20 and 30 microns being preferred.

While films of the present invention have various applications, one preferred application is the utilization of these films for the fabrication of laminated cushioning material such as, for example, the fabrication of cushion material utilizing two or more laminated plastic films with bubbles or cells formed therein to provide for cushioning. Briefly, the invention utilizes improved films for the fabrication of laminated cushioning material wherein one of the lamina is deformed so as to provide discrete raised segments or portions to which an additional or second layer is hermetically sealed in order to form sealed pockets or air-entrapping cells or bubbles. When exposed to shock forces or impact, the individual cells collectively provide a cushioning effect to resist the impact. Whenever large forces or impact occurrences arise, a number of the individual cells are ruptured and the entrained air and other materials captured in the cell are exhausted to atmosphere. The techniques and operations undertaken in producing such cushioning materials provides advantages in the release of corrosion inhibiting materials to the environment for enhanced protection.

When a film substrate has served its intended purpose and is to be discarded, it is becoming more and more important that the composition from which the film is formed be biodegradable. Indeed, certain legislation has been proposed which would ban the disposal of bags fabricated from non-biodegradable plastic film from compost heaps or piles. In this connection, standards have been adopted for classifying film bags as biodegradable, with this standard normally providing that no more than 10% of the film's original weight can remain on a ⅜th-inch screen following 12 weeks of exposure to a compost medium. Resin films prepared from a polymer resin selected from the group consisting of polylactic acid homopolymer, polyesters of butanediol, adipic acid, succinic acid, and terephthalic acid or polycaprolactone meet these standards. The biodegradable properties and characteristics of these films are not adversely affected when blended with one or more of the particulate corrosion inhibitors as set forth hereinabove.

Turning now to the biodegradable films or substrates, a lactic acid homopolymer is commercially available from Cargill, Inc. of Minnetonka, Minn. under the trade designation "Ecopla 4200-D", with this homopolymer being useful in the production of biodegradable films. Additionally, materials available from Mitsui Chemicals Inc. of Japan under the trade designation "Lacea" may be used. A biodegradable film forming resin is available from BASF of Parsippany, N.J. under the trade designation "Ecoflex" is useful for forming film products. Polyester polymers prepared from polycaprolactone are commercially available from Union Carbide under the trade designation "TONE", and "EASTAR" which is commercially available from Eastman Chemical. "Bionolle", a polyester available commercially from Showa Denko of Japan, is particularly useful as a film, a foam, or a non-woven sheet that can be coated or extruded in contact with corrosion inhibiting chemicals. Each of these resins may be blended with starch and may be compounded with the selected vapor and contact corrosion inhibitor chemicals or formulations to produce films capable of enhanced corrosion protection to the surfaces of packaged metallic articles. At the same time, when these films have served their useful purpose, they may be discarded as biodegradable materials to be received in conventional composting fields.

It is recognized that biodegradable films are more environmentally friendly, since the degradation of the film renders it more acceptable for use in situations where composting occurs. In accordance with the present invention, biodegradable films may be utilized in applications when the films are combined with the corrosion inhibitors of the type selected for use in connection with the present invention.

SUMMARY OF THE INVENTION

In accordance with the present invention, the corrosion inhibitors preferred for use in combination with the cushion packaging resins selected from the group consisting of amine salts, alkali nitrates, alkali dibasic acid salts, triazole compounds, and mixtures thereof. These corrosion inhibiting materials are especially useful in serving to protect surfaces of most metallic articles, with the triazole component being particularly useful in protecting copper against corrosion. These materials find particular utility in applications involving a lamination process wherein air cushioning cells are being utilized. In a typical production application, the selected corrosion inhibitors may be blended with the selected resin in relatively high percentages, such as between 10% and 20% to produce a masterbatch. This concentrated masterbatch formulation may then be further blended with film forming resins to produce a final blend suitable for ultimate extrusion as a film product, preferably containing between 1% and 3% of the vapor and contact corrosion inhibiting component within the film. In order to facilitate production of certain formulations, it is advantageous to prepare masterbatch formulations of a film forming material together with a second component to enhance the oxidation of the resin matrix, thus making it possible to blend various masterbatch formulations together to form the desired finished product.

Therefore, it is a primary object of the present invention to prepare an improved plastic resinous film for use in packaging and other applications, with the improved film combining the features of biodegradability with a vapor phase corrosion inhibitor for protection of metallic surfaces near the film package.

It is a further object of the present invention to prepare improved plastic resin packages for a variety of applications, the film combining the features of biodegradability, corrosion protection, and anti-static properties.

Other and further objects of the present invention will become apparent to those skilled in the art upon a study of the following specification and appended claims.

DESCRIPTION OF THE PREFERRED EMBODIMENT

In accordance with the preferred embodiment of the present invention, biodegradable film/vapor phase corrosion inhibiting blends are prepared for extrusion to produce films containing the desirable combination of properties set forth above. In order to describe the features of the preferred and other embodiments, the following specific examples are given.

THE VCI COMPONENT

The selected corrosion inhibiting chemicals suitable for preparing the masterbatch used in the above examples may alternatively be selected from amine salts of benzoic acid, amine salts of nitric acid, triazole compounds and derivatives, alkali nitrates, alkali dibasic acid salts, and mixtures thereof. Preferred mixtures having the following formulations may be advantageously employed:

| Component | Parts by Weight Range |
|---|---|
| FORMULATION 1 | |
| Disodium sebacate | 65–70 parts |
| Benzotriazole | 20–25 parts |
| Dicyclohexylammonium nitrate | 5–10 parts. |
| FORMULATION 2 | |
| Benzotriazole | 25–30% |
| Cyclohexylammonium benzoate | 60–65% |
| Sodium nitrite | 3–5% |
| Dicyclohexylammonium nitrate | 3–5%. |
| FORMULATION 3 | |
| Cyclohexylammonium benzoate | 60–70% |
| Monoethanolammonium benzoate | 5–10% |
| Benzotriazole | 5–10% |
| Dicyclohexylamonium nitrate | 15–25%. |
| FORMULATION 4 | |
| Benzotriazole | 5–10% |
| Disodium sebacate | 55–65% |
| Silica | 0–5% |
| Cyclohexylammonium benzoate | 15–25% |
| Monoethanolammonium benzoate | 5–10%. |

EXAMPLE I

A masterbatch of a biodegradable resin commercially available under the trade designation "Ecoflex" from BASF of Parsippany, N.J. is prepared by blending and extruding 100 parts of "Ecoflex" resin with 15 parts of VCI component consisting of selected vapor corrosion inhibitor components of Formulation 1 to produce an extruded masterbatch of 12–13% VCI. This masterbatch is further extended by blending with an additional quantity of "Ecoflex" and extruded as a film with excellent biodegradable and corrosion inhibition properties. In this formulation, the VCI component has a size range of up to 100 microns, although a size ranging up to a maximum of about 50 microns may be most suitably employed. "Ecoflex" is a resin described as an aliphatic aromatic copolyester with the butane diol comprising 50 mol percent of the resin, balance adipic acid and terephthalic acid. The resin has a melt temperature of 120° C. and films of this material are readily bonded through conventional thermal bonding or welding operations.

EXAMPLE II

A masterbatch of a biodegradable resin blend of a "TONE" polymer consisting of polycaprolactone and commercially available from Union Carbide under the trade designation "P-787" is blended with the vapor corrosion inhibitors of Formulation 2 and extruded to produce an extruded masterbatch of about 12% VCI. This masterbatch is further extended by blending with a further quantity of P-787 polycaprolactone resin to produce a mixture that can be extruded as a film, molded into selected shapes or mixed with blowing agents to produce contoured shapes suitable for packaging applications. The film, extruded articles and foams are especially useful as cushioning material in packaging and protecting metallic components. As a modified embodiment of this example, starch in a powdered particulate form is added in an amount ranging up to about 40% by weight.

EXAMPLE III

A masterbatch of a biodegradable resin blend of a polyester prepared from a composition consisting of succinic acid, adipic acid and butanediol, commercially available as a biodegradable resin under the trade designation "Bionolle 3001" from Showa Denko of Japan, is extruded with the VCI of Formulation 3 to produce a masterbatch of about 12% VCI. This masterbatch is further blended with more of this polyester and extruded as a film. Films made with this resin have a higher softening point and find utility where more heat resistance is needed.

EXAMPLE IV

A masterbatch of a biodegradable resin blend of "Ecoflex" commercially available from BASF and vapor corrosion inhibitor components as described in Example I is blended in the masterbatch product with an anti-static agent such as Polybatch VLA-55, commercially available from A. Schulman, at 20% anti-static agent, balance masterbatch, with this modified or resultant masterbatch being further blended with "Ecoflex" and extruded as a film. The finished film as extruded contains 3–5% anti-static VLA-55 and about 2% vapor corrosion inhibitor components. The film exhibited both anti-corrosion and biodegradability properties and meets Type II requirements under MAL-PRF-81705D, static dissipative materials.

Examples V through VII

The masterbatch resin of Example I was blended individually with the composition of Formulation 2 (Example V), Formulation 3 (Example VI), and Formulation 4 (Example VII) with results comparable to that of Example I.

Each of the Examples V through VII inclusive may be further blended with the anti-static component of Example IV with equivalent results.

LAMINATED CUSHIONING MATERIAL WITH ENTRAPPED AIR CELLS

Films fabricated in accordance with present invention have unique application for use as laminated cushioning material, particularly those cushioning products comprising two superposed films with at least one having raised embossments thereon. With a pair of such films, the raised embossments are preferably in opposed relationship, with the embossments being in registered relationship to each other so as to form substantially sealed raised cells with entrained air therewithin. Such cushioning materials are commercially available utilizing standard thermoplastic films, such as polyethylene.

In a typical production operation, films to be embossed are draped across the surface of a heated rotary embossing roller so as to create raised embossments of desired shape and configuration. Vacuum molding means are typically provided to create the embossments. With the embossments of the first and second opposed films being in register, one with the other, the surface layers of the film are brought into face-to-face contact under modest pressure, while at a temperature sufficient to provide a fusion or tacky state to create the bond. One example of preparing such cushioning material is found in the Chavannes U.S. Pat. No. 3,142,599 dated Jul. 28, 1964.

In a modified operation, air-inflated cushioning materials are formed by providing air under pressure so as to simultaneously fill and seal a pair of embossed flexible heat-sealable resinous films. In this operation, the films are fused together in discrete areas to form arrays of inflatable chambers of desired shape and configuration. One such operation is disclosed in Larson et al. U.S. Pat. No. 4,017,351 dated Apr. 12, 1977 and entitled "SYSTEM AND DEVICE FOR INFLATING AND SEALING AIR INFLATED CUSHIONING MATERIAL".

One of the advantages available from the use of cushioning material employing an array of cells is that in the final sealing operation, the conditions employed during the sealing operation may release a small quantity of corrosion inhibitor material from the film which then becomes captured and retained within individual cells for release upon the occurrence of a rupture due to impact, or the like. Accordingly, areas in close proximity to the ruptured cells are expected to benefit from a modestly enriched atmosphere of vapor phase corrosion inhibitor so as to provide more immediate protection to metallic surfaces susceptible of damage from exposure to the force or impact.

By way of summary, therefore, the present invention provides a basis for the utilization of a highly desirable more ecologically friendly biodegradable products which, when utilized, enhance the effectiveness of the products for use in the protection of metallic surfaces. Films prepared in accordance with the present invention provide a mechanism for protecting metallic surfaces against the potential deleterious effects of pro-oxidants present in the structure of most biodegradable plastic resin films. It will be further appreciated that the specific examples given herein are provided for purposes of illustration and for demonstrating the preferred manner of utilization of the features of the present invention. Therefore, these examples are illustrative of the present invention and are not deemed to be a limitation upon the scope to which the invention is otherwise entitled.

What is claimed is:

1. The process of preparing a biodegradable resin film or shaped article consisting essentially of a polymeric resinous film or shaped article selected from the group consisting of polyesters of polymers such as polylactic acid, polycaprolactone or other compatible polyesters, which comprises the steps of:
   (a) selecting a particulate vapor phase corrosion inhibitor from the group consisting of amine salts, triazole derivatives, alkali dibasic acid salts, alkali nitrites, and mixtures thereof;
   (b) preparing a blend of said particulate vapor phase corrosion inhibitor and said biodegradable resinous material wherein said vapor phase corrosion inhibitor comprises between 1% and 3% by weight of said polymeric resin;
   (c) extruding said blend into an oriented film having a thickness of between about 1 mil and 10 mils; and.
   (d) forming an air-entrained product from at least two of said oriented films by:

- (i) subjecting at least one of said films to an embossing operation to create a film structure with planar portions and self-supporting raised embossment portions;
- (ii) superimposing at least two of said oriented films to form a laminate pre-form; and
- (iii) fusing said planar portion to create raised cells with ambient air entrapped therewithin.

2. The biodegradable resin article product as defined in claim 1 being particularly characterized in that said resin article contains starch in powdered particulate form in an amount ranging up to 40% by weight starch, balance resinous component.

\* \* \* \* \*